United States Patent [19]

Nakamura et al.

[11] Patent Number: 4,727,997
[45] Date of Patent: Mar. 1, 1988

[54] SYNTHETIC-RESIN HOLLOW CONTAINER WITH GRIP

[75] Inventors: Yoshinori Nakamura; Yoshiki Miyazawa; Shigeo Yoshizawa, all of Nagano, Japan

[73] Assignee: Nissei ASB Machine Co., Ltd., Japan

[21] Appl. No.: 11,277

[22] Filed: Feb. 4, 1987

[30] Foreign Application Priority Data

Feb. 6, 1986 [JP] Japan .................... 61-24856

[51] Int. Cl.$^4$ .................... B65D 23/10; B65D 25/28
[52] U.S. Cl. .................... 215/100 A; 220/94 R; 220/94 A
[58] Field of Search .............. 215/100 R, 100 A, 1 C; 220/94 R, 94 A; 294/31.2, 33

[56] References Cited

U.S. PATENT DOCUMENTS

| 2,981,562 | 4/1961 | Long .................... 215/100 A X |
| 3,076,575 | 2/1963 | Leslie-Smith .............. 215/100 A X |
| 3,120,974 | 2/1964 | Matson .................... 294/31.2 |
| 3,140,329 | 7/1964 | Nutting .................... 215/100 A X |
| 3,463,536 | 8/1969 | Updegraff et al. .................. 294/31.2 |
| 3,688,936 | 9/1972 | Killigrew, Jr. .................... 294/33 X |
| 4,194,641 | 3/1980 | Gaiser .................... 215/100 A |
| 4,311,246 | 1/1982 | Saito et al. .................... 215/100 A |
| 4,363,415 | 12/1982 | Rainville .................... 215/100 A |
| 4,368,826 | 1/1983 | Thompson .................... 215/100 A |
| 4,629,598 | 12/1986 | Thompson .................... 215/1 C X |

FOREIGN PATENT DOCUMENTS 889343  2/1962  United Kingdom ........... 215/100 A

Primary Examiner—William Price
Assistant Examiner—Sue A. Weaver
Attorney, Agent, or Firm—Ostrolenk, Faber, Gerb & Soffen

[57] ABSTRACT

Disclosed is a container such as a synthetic resin bottle formed by stretching blow molding an injection-molded parison, the container including a container body whose side is provided with a secondarily molded grip, and a method of molding a hollow container with a grip.

4 Claims, 7 Drawing Figures

SYNTHETIC-RESIN HOLLOW CONTAINER WITH GRIP

BACKGROUND OF THE INVENTION (1) Field of the Invention

This invention relates to a hollow container with a grip such as a synthetic resin bottle in which a blow-molded container body has on its side a secondarily molded grip, and a method of molding the same.

(2) Description of the Prior Art

For conventional molding of a hollow container with a grip, there are two methods. One method comprises, when an extrusion-molded parison is blow molded into a hollow container, inflating a part of the parison toward the side of a container body to mold a grip.

A method of integrally molding a grip simultaneously with blow molding of the container is widely employed in a method of molding a container which is generally called blow molding. However, in a stretching blow molding, a parison is axially stretched within a blow mold and a wall thickness of a molded container is extremely thin as compared with one obtained by blow molding, and therefore it is difficult to mold a grip, thus not employing such molding.

The other method comprises, when a closed-end parison is injection molded, integrally premolding a grip on the side of a mouth which requires no blow molding. This method of premolding a grip on the parison mouth forming a mouth of a container may be applied also to the stretching blow molding. However, since a grip is molded, the mouth must be formed to be longer than that of a normal container, and the shape or configuration thereof becomes a special shape such as a long-neck bottle. This method poses a problem in that it is hard to be employed for containers generally widely used.

SUMMARY OF THE INVENTION

This invention has been accomplished in order to solve the aforementioned problems as noted above with respect to prior art. It is an object of the present invention is to provide a new hollow container in which even a synthetic resin container obtained by stretching blow molding an injection molded parison, a container body has on its side a grip.

It is a further object of the present invention to provide a method of molding a hollow container with a grip wherein whatever means for molding a hollow container may be, a grip may be secondarily molded on the side of a container body without being affected by said molding method, and the grip is not disengaged from the container body despite the fact that the grip is secondarily formed on a blow or stretching blow molded container.

In a hollow container with a grip according to this invention for achieving the aforesaid objects, annular grooves of a container body, which comprises said container body having annular grooves in an outer periphery of a biaxially oriented shell formed by stretching blow molding and a synthetic resin grip injection molded relative to the container body together with connecting rings received in the annular grooves and mounted on the side of the container body by engagement between the connecting rings and the annular grooves, is molded on the peripheral side of the container body within a blow mold simultaneously with blow molding of a hollow container such as a synthetic resin bottle. A grip member is molded, after a container body has been removed from a blow mold, by inserting it into a grip molding mold in the form of a split mold provided with a grip molding cavity connected to a container receiving portion and the annular grooves. Molding is carried out by pouring molten resin into a mold after applying internal pressure to the container and filling said annular grooves and said grip molding cavity with resin, and a grip is formed on the side of the container body integral with the connecting rings fitted in the annular grooves.

In the hollow container with a grip molded by the means as described above, since the connecting rings are brought to be fitted in the annular grooves formed in the shell and integrally connected, even if the container is held by gripping a grip, the container body is not slipped out of the grip due to the weight of content. Furthermore, since resin is poured into the blow molded container to mold the grip, the container with a grip may be molded without being affected by a molding method for a container and a shape thereof.

BRIEF DESCRIPTION OF THE DRAWINGS

The drawings show a hollow container with a grip according to this invention, steps of molding the container, and a mold device with a container body being shown in longitudinal section, in which.

DESCRIPTION OF THE PREFERRED EMBODIMENTS

Figure 1:
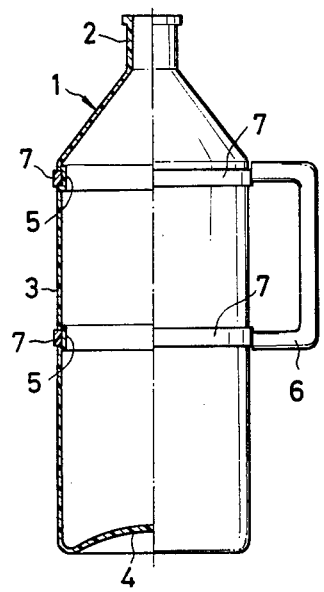
FIG. 1 is a longitudinal sectional front view of a half of a hollow container with a grip.

In the drawings, reference numeral 1 designates a body of a container in the form of a bottle produced by stretching blow molding an injection-molded closed-end parison within a blow mold, in which a shell 3 and a bottom 4 except a neck 2 are biaxially oriented.

Two annular grooves 5, 5 formed simultaneously with molding of a body are provided spaced apart in the outer peripheral surface of the shell 3.

A grip indicated at 6 is formed integral with two connecting rings 7, 7 received in the annular grooves 5, 5.

Figure 2:
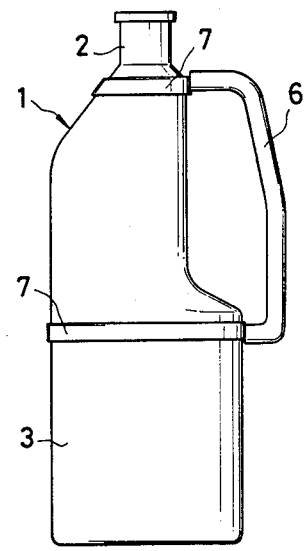
FIG. 2 is a front view showing a further example.

FIG. 2 shows an example in which one connecting ring 7 is provided at the lower side of the neck 2.

Figure 3:
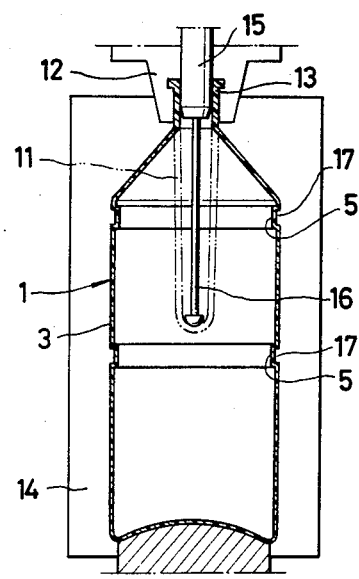
FIG. 3 is a longitudinal sectional front view when a container is being molded.
Figure 4:
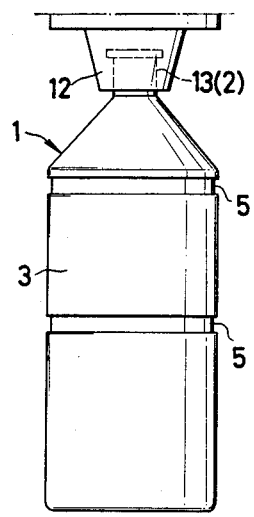
FIG. 4 is a front view of a container.
Figure 5:
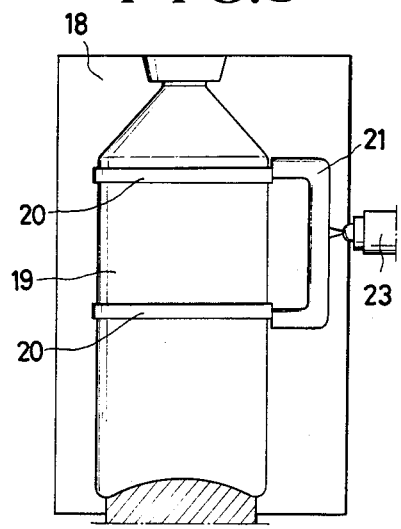
FIG. 5 is a front view showing a half of a grip molding mold.
Figure 6:
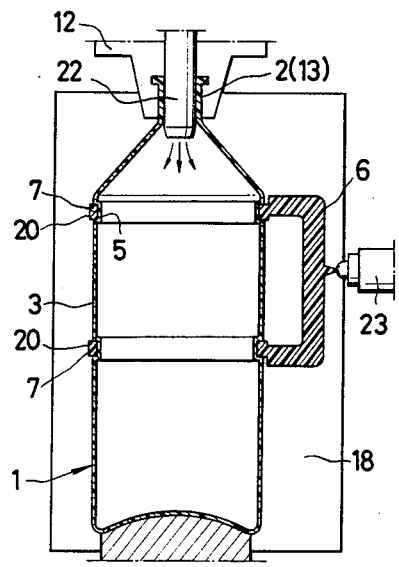
FIG. 6 is a front view showing a half of a mold when a grip is being molded.

Next, a molding method for a hollow container shown in FIG. 3 will be described.

FIG. 3

An injection-molded closed-end parison 11 is received into a cavity of a blow mold 14 in the form of a split mold with a neck 13 held by a neck mold 12, and stretching blow molding is carried out. In molding, axial stretching is carried out by an elongated rod 16 in the central portion of a blow core 15 fitted into the neck 13 through the neck mold 12 and air is blown from a blow core 15 into the parison 11 to fully expand the parison 11 in the cavity. The shell 3 of the container body 1 obtained by said molding is biaxially oriented. The neck 13 of the parison 11 constitutes the neck 2 of the container body 1 without modification.

In molding of the container body 1, two upper and lower annular projections 17, 17 are provided parallel to each other in a spaced apart relation on the surface of the cavity of the blow mold 14. The annular grooves 5, 5 are formed in the outer peripheral side of the shell 3 of the container body 1 by the annular projections 17, 17 simultaneously with molding of the container body.

FIG. 4

Next, the container body 1 is removed from the blow mold 12 and transferred to the grip molding mold 18. This transfer of the container body 1 may be carried out by the neck mold 12 in the case where molding of the container body and molding of the grip are continuously carried out within one and the same machine, but when molding of the grip is carried out by the mold provided on a separate apparatus, the container body 1 is held by a removing machine and transported to a position of the mold.

FIG. 5

The grip molding mold 18 is composed of a split mold provided with a recess which forms a receiving portion 19 having the same dimension as that of the container body 1, and molding grooves 20, 20 in the same position as that of the annular grooves 5, 5 are formed in the surface of the recess. A cavity 21 connected to the annular grooves 5, 5 is provided on one end of the molding grooves 20, 20 while being positioned in the parting surface.

FIG. 6

The container body 1 is inserted into the receiving portion 19 by closing the grip molding mold 18, clamping is carried out, air is then blown by means of an air nozzle 22 set in the neck mold 12, air pressure of the order of 5 to 10 kg is applied to the container body 1, and molten resin is poured under low pressure into the mold from an injection cylinder 23 in nozzle touch with the mold. The resin is filled in an annular cavity formed by the annular groove 5 and the molding groove 20 and in a grip molding cavity, where a grip 6 integral with the connecting rings 7, 7 is formed.

Since the connecting rings 7, 7 and the grip 6 are molded by low pressure filling, sink marks tend to occur when they are cooled, and therefore, air pressure in the range of 20 to 30 kg is applied into the container for pressurization after injection and filling have been completed.

After the grip 6 has been molded in the manner as described above, air pressure within the container body is removed, and the mold is opened to remove the container body 7. The molded container body 1 is now provided with the grip 6 integrated by the connecting rings 7, 7 fitted in the annular grooves 5, 5.

Figure 7:
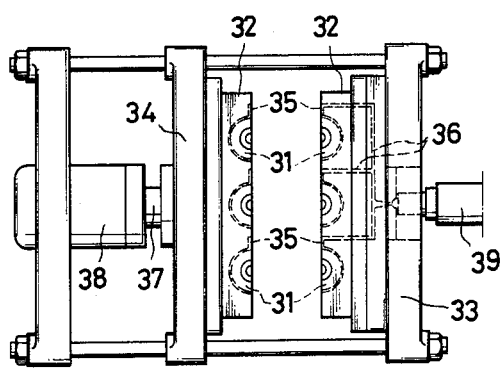
FIG. 7 is a plan view of a multi-cavity mold device for molding a grip.

FIG. 7 shows an embodiment of a multi-cavity mold device for molding a grip. Split molds 32, 32 having three receiving-portion forming recesses 31, 31 are mounted on a stationary plate and a movable plate 34, and a resin passage 36 communicated with each of grip molding cavities 35, 35 provided in the parting surface is provided in a split mold on the side of the stationary plate 33.

Insertion of the container into the grip molding mold device may be carried out from the side or the top. Opening and clamping of the mold may be carried out by a hydraulic cylinder 38 and a ram 37 in a manner similar to the normal case. Reference numeral 39 denotes an injection cylinder.

In this invention, the resin used to mold the container body 1 and the grip 6 can be of those of the same or different in quality, for example, the container body can be formed of polyethyleneterephtalate and the grip of polypropylene. In terms of molding, the resin used for the grip is one having a lower melting point than that of the resin used for the container, and for example, it is preferable that the container body 1 is molded of polyethyleneterephthalate, and the grip of polyethylene.

What is claimed is:

1. A synthetic resin hollow container with a grip, the container comprising a hollow injection molded, axially stretched, biaxially oriented synthetic resin container body; annular grooves formed in the outer periphery of said container body; connecting rings received in said annular grooves; and a synthetic resin grip injection molded relative to the container body together with said connecting rings, said grip integrally mounted on the side of the container body by fitting engagement between said connecting rings and said annular grooves.

2. A synthetic resin hollow container with a grip according to claim 1, wherein the synthetic resin of which said container body and said grip are formed is one and the same synthetic resin.

3. A synthetic resin hollow container with a grip according to claim 1, wherein the synthetic resin of which said grip is formed comprises a synthetic resin having a lower melting point than that of the synthetic resin of which said container body is formed.

4. A synthetic resin hollow container with a grip according to claim 1, wherein said container body is formed of polyethyleneterephthalate, and said grip is formed of polyethylene or polypropylene.

* * * * *